Figure 4:
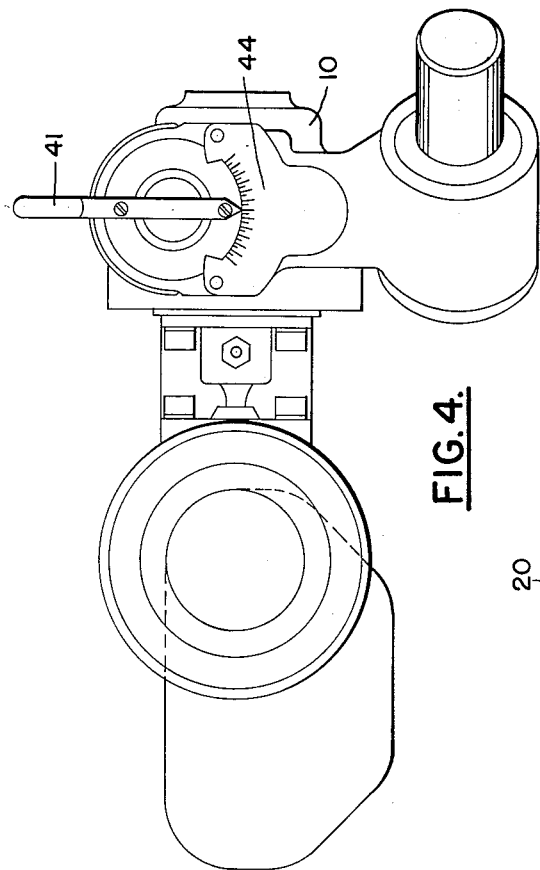

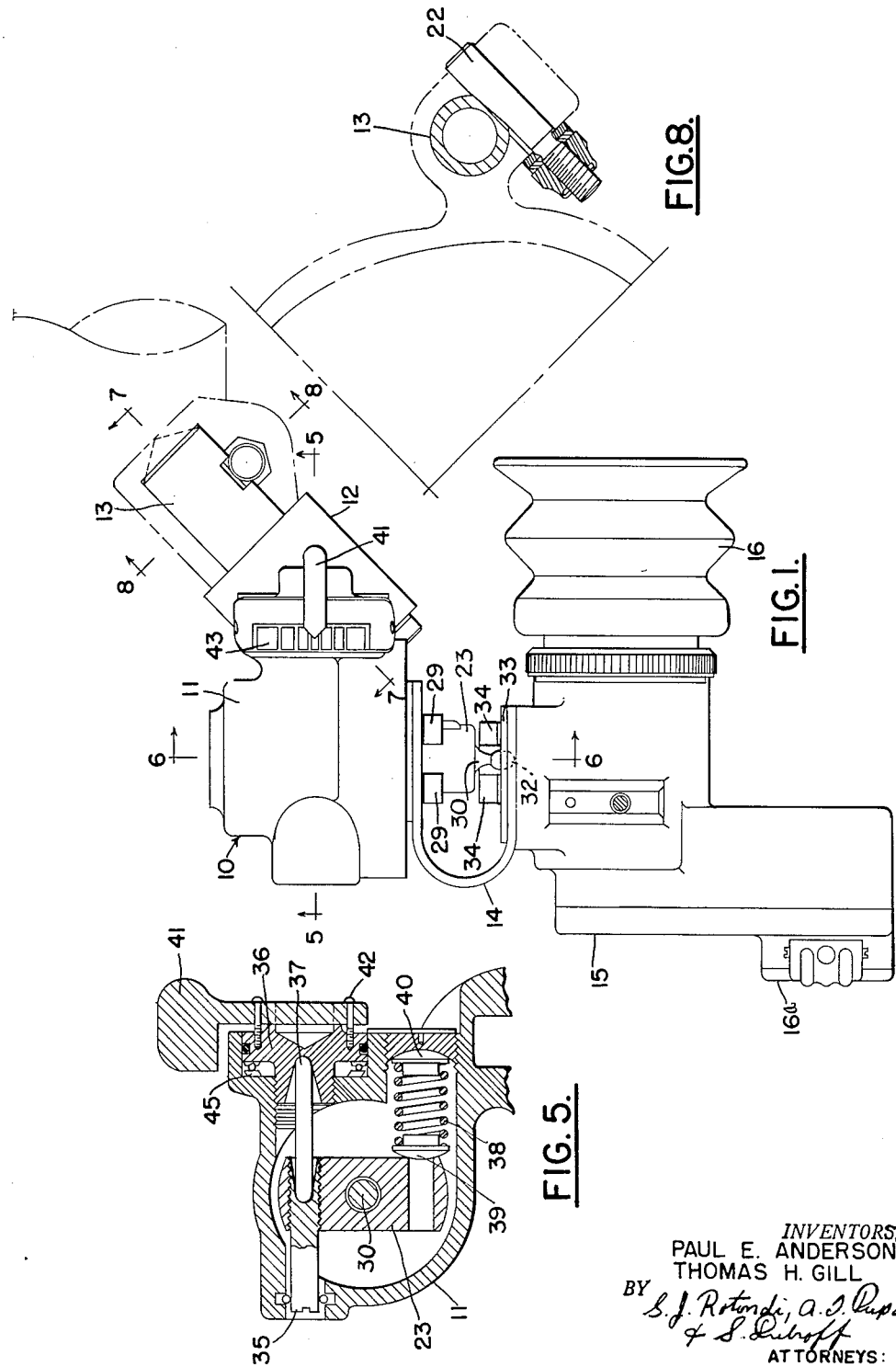

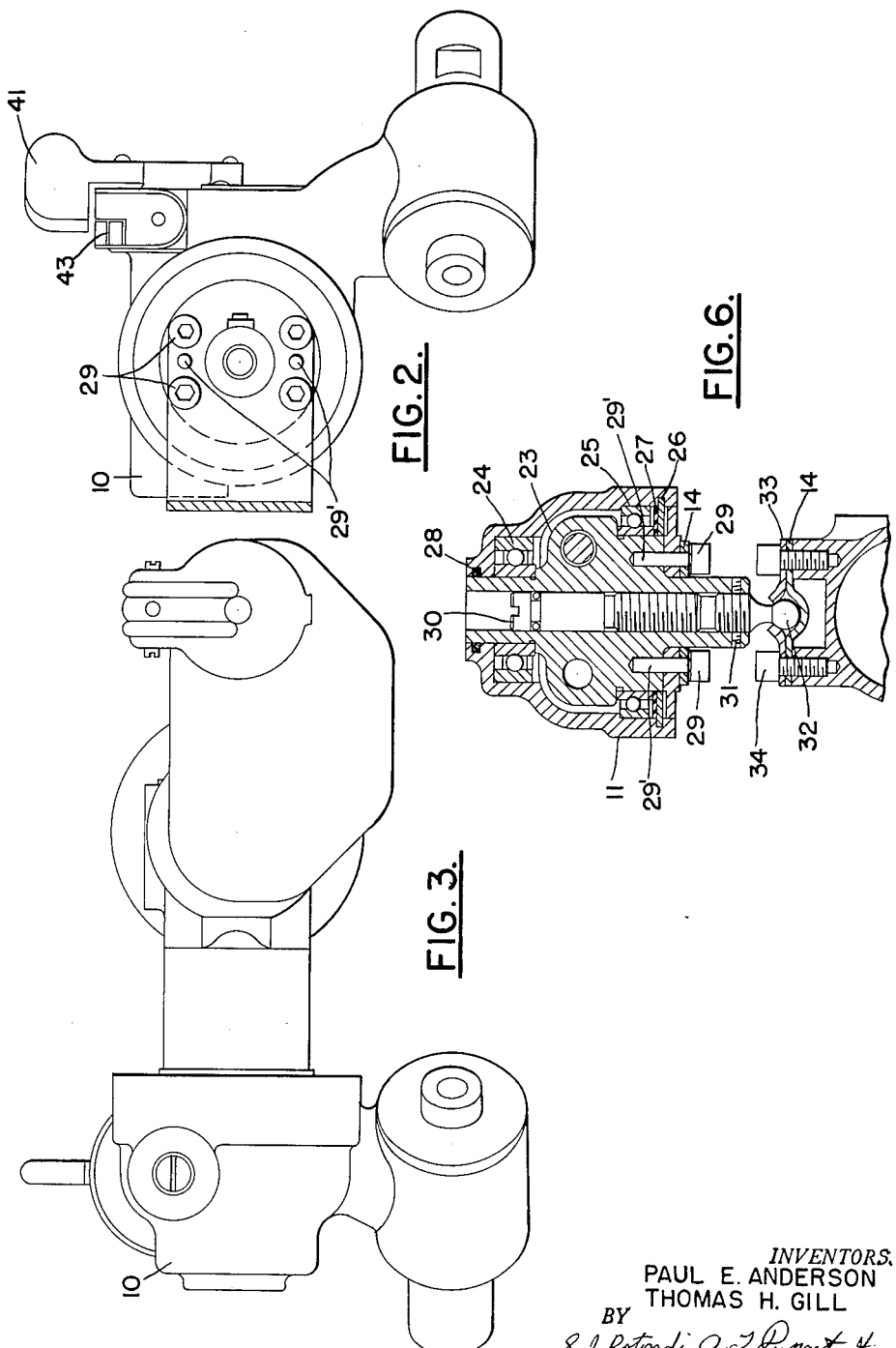

June 25, 1963   P. E. ANDERSON ETAL   3,094,786
TELESCOPIC SIGHT MOUNT

Filed Sept. 13, 1960   4 Sheets-Sheet 3

INVENTORS.
PAUL E. ANDERSON
THOMAS H. GILL
BY
ATTORNEYS:

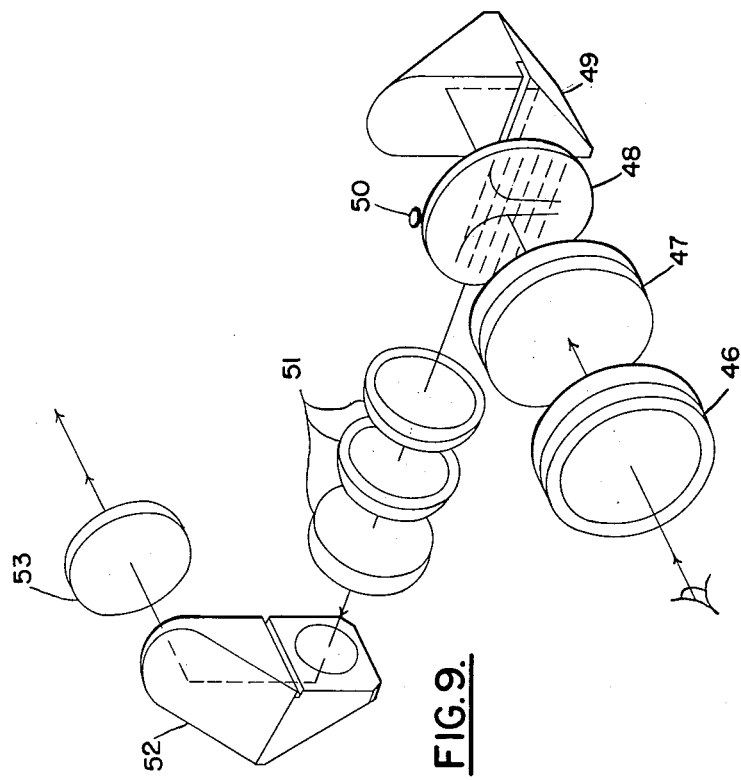

United States Patent Office 3,094,786
Patented June 25, 1963

3,094,786
TELESCOPIC SIGHT MOUNT
Paul E. Anderson, Torrance, and Thomas H. Gill, Whittier, Calif., assignors, by mesne assignments, to the United States of America as represented by the Secretary of the Army
Filed Sept. 13, 1960, Ser. No. 55,814
6 Claims. (Cl. 33—50)

The invention relates to mounts for telescopic sights, and more particularly to an improved sight mount which is susceptible of smooth and accurate adjustment to different positions and exhibts during its use a high order of resistance to misadjustment from any position to which it has been set.

Fixed focus telescopic sights are frequently supported upon a mount which is fixed to a weapon or other device and is operable to adjust the sight in azimuth and elevation. Such a mount is subject to severe shock and strain when fixed to a device such as a rocket launcher. This makes it diffcult to maintain the mount in any position to which it is adjusted. As a result, the sight tends to become misalined during use of the device to which its mount is attached. Another difficulty encountered in the use of such mounts is the velocity and range differentials caused by variations in the actual temperature of the rocket propellant at the time of firing.

In accordance with the present invention, these difficulties are avoided by the provision of a telescopic sight mount wherein (1) the azimuth and elevation adjusting elements are locked in their adjusted positions against a resilient pressure, and (2) the elevation adjusting element includes means operable to compensate for velocity and range differentials caused by variations in the actual temperature of the rocket propellant at the time of firing.

The invention will be better understood from the following description when considered in connection with the accompanying drawings and its scope is indicated by the appended claims.

Referring to the drawings:
FIGS. 1 to 4 are respectively top, side, front and back views of the mount and sight,
FIG. 5 is a sectional view of the mount taken on the line 5—5 of FIG. 1,
FIG. 6 is a sectional view of the mount taken on the line 6—6 of FIG. 1,
FIG. 7 is a section taken on the line 7—7 of FIG. 1,
FIG. 8 is a sectional view taken on the line 8—8 of FIG. 1, and
FIG. 9 is an isometric view of an optical system which is embodied in the sight and was available prior to the present invention.

FIGS. 1 to 4 illustrate a mount 10 consisting essentially of two housings 11 and 12 angularly disposed with respect to each other. The lower housing 12 carries a mounting post 13 for attaching the mount to the launcher. The upper housing 11 contains the bore sighting adjustment means and the round temperature compensating setting device.

Mechanically coupled to the mount 10 through a U-shaped bracket 14 is a telescopic sight body 15 which encloses the optical system illustrated by FIG. 9 and has at its viewing end a rubber eye shield 16. This shield functions to exclude light from the operator's eye, to cushion the operator from recoil or shocks and to provide a buffer between the sight and launcher when the sight is moved into its stowage position as hereinafter explained. Hinged to the opposite or front side of the sight is a cover 16a designed to protect the objective window of the optical system from foreign matter, and, on occasion, to provide a sun shade for the window.

Figure 7:
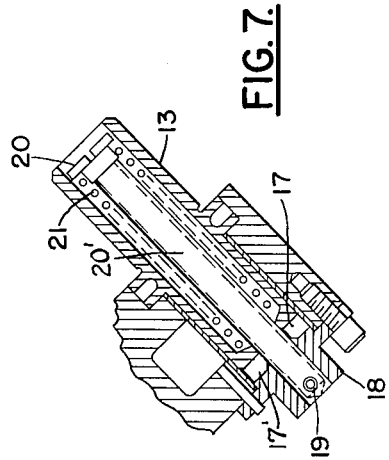

The housed end of the mounting post 13 is fitted with a V-groove 17 matching a V-wedge 17' of the mounting cap 18 (see FIG. 7). Pinned to the cap 18 through pins 19 and 20 and a coupling member 20' is a spring 21 which keeps the cap wedge in the post groove. By lifting the mount assembly 10 approximately 0.125 inch, so that the post wedge clears the post groove, the sight assembly may be rotated 180 degrees about the post 13 from its operative position to its stowage position with its eyepiece 16 against the barrel of the launcher. It may be locked in position by a bolt 22 (FIG. 8).

The azimuth and elevation adjusting mechanisms are located within the casing 11. The details of the elevation adjusting mechanism appear in FIG. 5 and those of the azimuth adjusting mechanism appear in FIG. 6. Common to these two mechanisms is a hub 23 which is rotatable in bearings 24 and 25 (FIG. 6), and is held in place by a spring retaining ring 26. A sealing washer 27 is between the retaining ring 26 and the bearing 25 and an O-ring 28 is between the shaft of the hub 23 and the body 11. The hub 23 is fixed to one leg of the U-shaped spring 14 by means of bolts 29 and two dowels 29'.

An azimuth adjusting screw 30 is threaded into the hub 23, is frictionally engaged by nylon plugs 31 to prevent its becoming loose, and has at one end a ball 32 which is clamped between one end of the spring 14 and a member 33 by means of bolts 34, thus fixing it to the sight assembly 15.

With the screw 30 thus fixed to the sight assembly 15, rotation of the screw causes a deflection of the spring bracket leg which, in turn, changes the telescope line of sight in azimuth. The design range of azimuth bore sighting adjustment is from 20 mils left to 20 mils right. Approximately 144 degrees rotation of the adjusting screw 30 is required to provide the 20 mil azimuth deflection of the sight line.

An elevation adjustment screw 35 (see FIG. 5) for bore sighting the instrument, is threaded transversely into the hub 23 and is cup-shaped at its inner end. A cup-ended nut 36 is threaded into the body 11. Between the cup-shaped ends of the members 35 and 36 is a spherically ended link pin 37. Ths pin resists the torque imposed upon the hub 23 by a spring 38 acting through spherically seated riders 39 and 40. This torque is of the order of 20 inch-pounds.

Rotation of the elevation adjustment screw 35 causes a proportional rotation of the hub 23, and with it the sight assembly 15, causing a corresponding change in elevation or depression of the telescope line of sight. The design range of elevation bore sighting adjustment is from 20 mils depression to 20 mils elevation. Approximately 144 degrees rotation of the adjusting screw 35 is required to provide the 20 mil elevation or depression of the sight line.

The nut or knob 36 is fixed to a temperature compensator handle 41 by means of screws 42 (see FIG. 5) and registers against two index plates 43 and 44 (FIGS. 2 and 4). The lower scale 44 is graduated in ½ mil intervals from minus 2 mils to plus 10 mils in elevation, each mil being the equivalent of 13.75° F. change in round temperature. The upper portion of the handle 41 registers with a scale which is graduated in temperature zones, identified by different colors corresponding to the temperature equivalent of the mil scale index 44.

Rotation of the handle 41 causes the knob 36 to screw inward or outward a proportionate distance, which, acting through the link pin 37 against the torque of the spring 38 causes the hub 23 and sight assembly 15 to rotate in elevation a corresponding amount. As designed, a 7 degree 12 minute rotation of the handle 41 produces 1 mil change in elevation of the sight line. A spring fingered washer, 45, upon which are affixed two small balls is mounted in the recess behind the knob 36. These balls engage spaced serrations in the inner face of the knob, providing a "click-stop" for each 3 degree 36 minute arc of handle rotation. This is the equivalent of ½ mil elevation temperature adjustment.

The optical system of the sight 15 is indicated by FIG. 9. It includes an eyelens 46, a field lens 47, a reticle 48, a prism 49, a reticle light window 50, an objective 51, a prism 52 and an entrance window 53. As previously indicated, this optical system was known prior to the present invention and is illustrated only for convenience in a complete understanding of the instrument.

We claim:

1. The combination of a telescopic sight, a sight mount including a casing enclosing a rotatable hub, an azimuth adjusting screw extending through and threadedly engaging said hub, a resilient bifurcated bracket having one leg fixed to said hub and the other leg fixed to said sight and to said azimuth adjusting screw, resilient means within said casing arranged to apply a torque to said hub, and an elevation control means on said casing for adjusting the position to which said hub is rotated by said torque.

2. The combination of a telescopic sight, a sight mount including a casing enclosing a rotatable hub, an azimuth adjusting screw extending through and threadedly engaging said hub, a resilient bifurcated bracket having one leg fixed to said hub and the other leg fixed to said sight and to said azimuth adjusting screw, resilient means within said casing arranged to apply a torque to said hub, an elevation control means on said casing for adjusting the position to which said hub is rotated by said torque, said elevation control means including a knob threaded into said casing and recessed at its inner end, and an elevation adjustment screw threaded into said hub and recessed at its inner end and a pin extending between said recessed ends.

3. A combination according to claim 2 wherein said casing bears a temperature compensation scale and wherein a pointer fixed to said knob is arranged to cooperate with said scale.

4. A combination according to claim 2 wherein said casing bears temperature scales calibrated respectively in mils and in colors and wherein a pointer fixed to said knob is arranged to cooperate with said scales.

5. The combination of a fixed housing having a pair of bearings, a hub rotatable in said bearings, a resilient bifurcated bracket, a telescopic sight fixed to one leg of said bracket, said rotatable hub being connected to the other leg of said bracket, an azimuth adjusting screw connected to said one leg and threadedly engaging said hub, said azimuth adjusting screw being concentric with said hub, means within said casing exerting a torque tending to rotate said hub in said bearings, and elevation control means on said casing limiting the extent to which said hub is rotated by said torque.

6. A combination according to claim 5 wherein said elevation control means includes a member coupled to said hub and adjustable to compensate for velocity and range differentials caused by variations in the temeprature of a propellant at the time it is fired.

References Cited in the file of this patent

UNITED STATES PATENTS

| | | |
|---|---|---|
| 2,568,715 | Brown | Sept. 25, 1951 |
| 2,814,118 | Evans | Nov. 26, 1957 |
| 2,889,628 | Musser et al. | June 9, 1959 |